United States Patent [19]

Martell

[11] Patent Number: 4,634,859
[45] Date of Patent: Jan. 6, 1987

[54] OPTICAL ENCODER WITH TWO PHOTOSENSORS

[75] Inventor: Dennis J. Martell, Naperville, Ill.

[73] Assignee: Northern Illinois Gas Company, Aurora, Ill.

[21] Appl. No.: 596,236

[22] Filed: Apr. 2, 1984

[51] Int. Cl.$^4$ .......................... G01B 11/00; G01D 5/34
[52] U.S. Cl. .............................. 250/231 SE; 340/347 P
[58] Field of Search ..................... 250/231 SE, 237 R; 324/173–175; 340/347 P

[56] References Cited

U.S. PATENT DOCUMENTS

| | | |
|---|---|---|
| 3,222,529 | 12/1965 | Askowith . |
| 3,264,639 | 8/1966 | Lerman et al. .................. 340/347 P |
| 3,562,541 | 2/1971 | Schroeder . |
| 3,699,560 | 10/1972 | Meunier et al. . |
| 3,727,057 | 4/1973 | Higby et al. . |
| 3,783,277 | 1/1974 | Younkin et al. . |
| 3,931,513 | 1/1976 | Germain . |
| 3,944,923 | 3/1976 | Luteran .................. 324/175 |
| 4,489,384 | 12/1984 | Hurley et al. .................. 250/231 SE |

Primary Examiner—Edward P. Westin
Attorney, Agent, or Firm—Emrich & Dithmar

[57] ABSTRACT

An optical encoder for indicating revolutions of a shaft includes two phototransistors positioned to be energized concurrently by light from a light source, a barrier rotated by the shaft to shade the photosensors from the light source during a portion of each revolution, and a signal processing circuit which responds to outputs of the photosensors when both are illuminated to provide an unambiguous indication at the end of each revolution of the shaft. The signal processing circuit includes a latch circuit which is set in response to one photosensor, providing an output while the other photosensor is providing its output. The latch circuit is reset when the outputs from both photosensors terminate.

17 Claims, 4 Drawing Figures

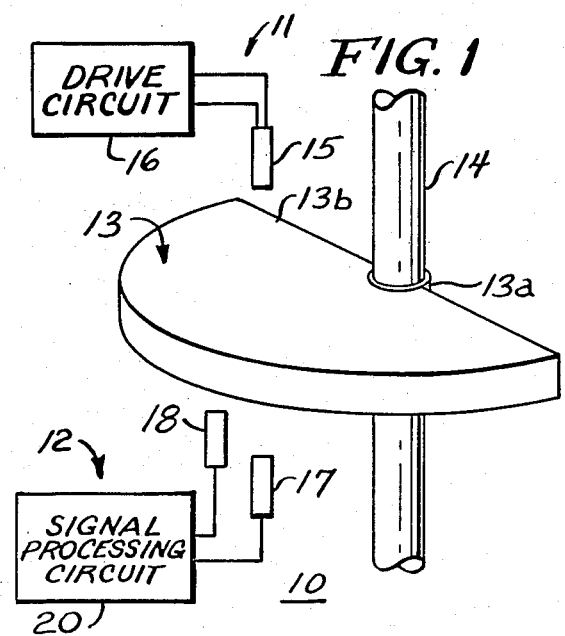
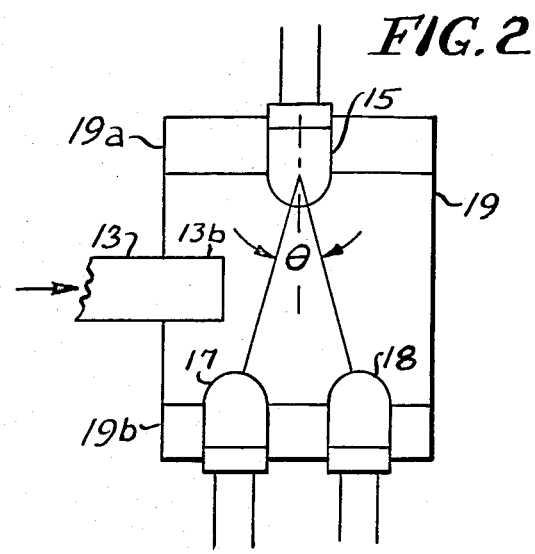
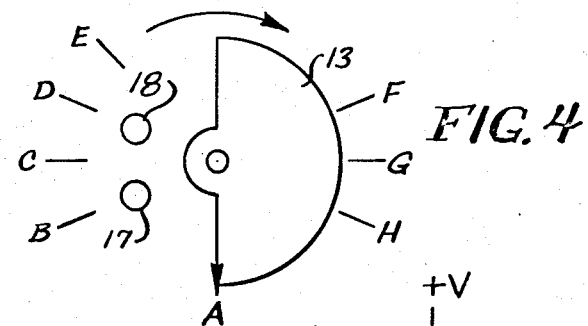
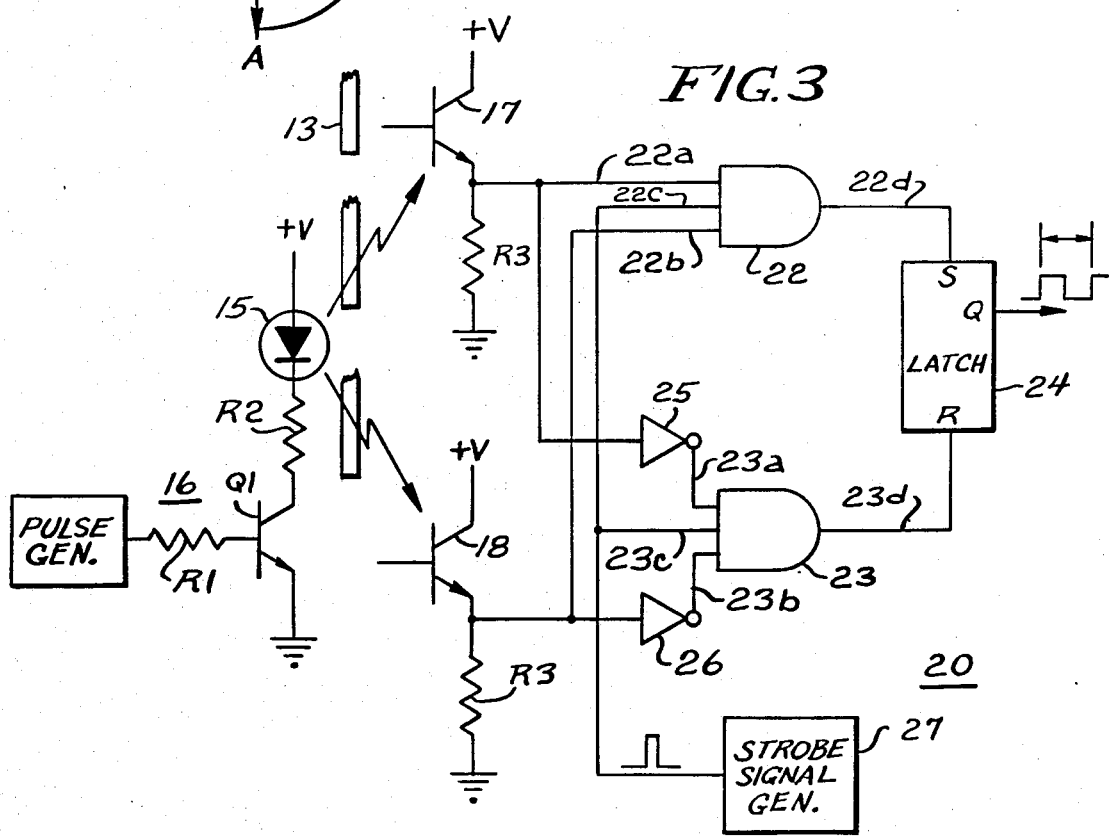

OPTICAL ENCODER WITH TWO PHOTOSENSORS

BACKGROUND OF THE INVENTION

This invention relates to analog-to-digital converters, and more particularly, to an optical encoder apparatus for indicating revolutions of a shaft.

Optical encoders are commonly used to convert shaft positional information into digital signals. The information provided by the encoder may represent the angular position of the shaft or the number of revolutions made by the shaft. In the former case, the encoder includes a complex code member which designates or defines a number of discrete shaft positions, commonly referred to as digit positions, and the encoder provides a different multibit binary-coded word for each digit position. The presence of a complex code member permits shaft position encoders to take into account interdigital positions so as to provide an unambiguous coding of shaft position information.

Shaft position encoders, on the other hand, are of simple construction, including a single sensor, a light source and a shutter rotated by the shaft. The shutter is adapted to normally interrupt or block the illumination of the sensor by light from the light source, but to permit illumination of the sensor during a short time for each revolution of the shutter. Upon illumination, the sensor provides a change in its output state. The number of times that the output state changes over a given period is a representation of the number of complete revolutions of the shaft during that period.

Ideally, for single sensor encoders, the output state of the sensor will change only once each revolution, and under such ideal condition, the encoder would provide an unambiguous indication at the completion of each revolution of the shaft. However, various conditions, either mechanical or electrical in nature, may cause multiple false counts in single sensor encoders. For example, in a multi-dial utility meter register which measures usage of a commodity such as gas, water or electricity, the shafts are rotated at a very slow speed through the use of reduction gear train, and the rotational speed of the shafts varies with changes in demand of the commodity. Under such conditions, shutter backlash may cause multiple outputs to be provided during one revolution. Other factors contributing to multiple false counts are ambient light leakage and device tolerances, particularly when semiconductor light sensing devices are used.

SUMMARY OF THE INVENTION

It is an object of this invention to provide an encoder apparatus for indicating revolutions of a shaft and which also provides an unambiguous indication at the completion of each revolution of the shaft.

Another object of the invention is to provide an encoder apparatus characterized by low power usage.

These and other objects are achieved by the present invention which provides an encoder apparatus for indicating revolutions of a shaft. The encoder apparatus comprises a source of light, first and second light sensing means, and a light barrier means driven by the shaft to shade said first and second light sensing means from said source of light during a portion of each revolution of the shaft. The first and second light sensing means are located in a spaced-apart relationship to be illuminated in sequence as said light barrier means is driven by the shaft, and said light barrier means is configured to enable concurrent illumination of said first and second light sensing means. A signal processing means responds to both of said sensing means, providing the same output concurrently to provide an indication of the completion of a revolution of the shaft. Thereafter, the signal processing means is nonresponsive to outputs provided by the light sensing means, until both of the outputs have terminated concurrently, so that the signal processing means provides an unambiguous indication at the completion of each revolution of the shaft.

In accordance with a disclosed embodiment, the signal processing means provides its indication in response to outputs indicative of sequential and concurrent illumination of the two light sensing means; i.e., the light sensing means are illuminated in sequence, and the second light sensing means is illuminated while the first light sensing means is still illuminated. Thereafter, the signal processing means does not again respond to an output, indicative of illumination, whether provided by either one or by both of the sensing means until after such time as the outputs provided by both sensing means have indicated that both sensing means have been shaded from the source of light.

The location of the first and second light sensing means and the configuration of the light barrier means enables the sensing means to be illuminated in sequence and concurrently. To this end, the light barrier means comprises a planar member having a light impervious portion which is semicircular in shape. The member is carried by the shaft and rotatable therewith to have its light impervious portion interposed between the source of light and the first and second light sensing means as the shaft rotates through a portion of a revolution, and to permit illumination of at least one of the sensing means during the remainder of the revolution of the shaft as the light impervious portion is rotated out from between the sensing means and the source of light. Moreover, the first and second light sensing means are located in a spaced relationship on the same circumference, i.e., at the same radial distance from the axis of the shaft.

In the disclosed embodiment, the signal processing means includes a bistable circuit which is operated to one stable state in response to outputs provided when both light sensing means are illuminated. The bistable circuit is maintained in such state as long as either one of the light sensing means continues to be illuminated and provides its output. The bistable circuit is operated to its other stable state when both light sensing means become shaded from the light source and both outputs are terminated. In this arrangement, the bistable circuit provides a binary pulse output at a first level for that portion of revolution of the shaft for which the light barrier means shades the two light sensing means and provides an output at a second level for the remainder of the shaft revolution cycle.

In accordance with a feature of the invention, the light source means comprises an infrared light emitting diode which is pulse driven to minimize power consumption. This results in a low power usage light source which renders the encoder apparatus suitable for use in applications where the power source is a battery.

DESCRIPTION OF THE DRAWINGS

FIG. 1 is a perspective view of an optical encoder apparatus provided by the present invention;

FIG. 2 diagrammatically illustrates in plan arrangement the light source and the photosensors;

FIG. 3 is a schematic circuit diagram of a signal processing circuit of the optical encoder apparatus illustrating the light source and the photosensors, and;

FIG. 4 is a schematic representation illustrating positions of the light barrier relative to the photosensors.

DESCRIPTION OF A PREFERRED EMBODIMENT

Referring to FIG. 1, the optical encoder apparatus 10 includes a light source 11, a light detecting circuit 12, and a shutter or light barrier 13, carried by a shaft 14. The optical encoder apparatus 10 generates an output indicative of the number of revolutions of the shaft 14 and provides an output suitable for transmission to a data processing center using remote interrogation techniques known in the art.

By way of example, the shaft 14 may be associated with a register dial (not shown) of a utility meter which measures the consumption of a commodity such as gas, water, electricity, and the like. The shaft carries a pointer (not shown) which provides a visual indication of the angular portion of the shaft to thereby indicate a measured quantity. Such meter registers generally have several dials and associated shaft mounted pointers, each dial indicating a different digit of measurement, such as hundreds, tens, units, tenths, etc. The encoder apparatus of the present invention may count the number of revolutions made by any one of these dial shafts. The selection of which shaft for which rotations are to be counted is a function of application, frequency of interrogation, etc.

The light source 11 includes an infrared light emitting diode 15 and a drive circuit 16 which provides a pulsed drive for energizing the light emitting diode 15. The light emitting diode 15 is located above the plane of the barrier 13 and directs infrared radiation downwardly.

The light detecting circuit 12 comprises a pair of light sensing devices 17 and 18 and a signal processing circuit 20. The light sensing devices are located beneath the plane of the barrier 13.

The barrier 13 is a planar member generally semicircular in shape and defining a hub 13a at its center by which it is attached to the shaft 14 in a suitable manner. The barrier is of a lightweight material and is light impervious so as to shade the two phototransistors 17 and 18 from the light source when the barrier 13 is interposed therebetween. While illustrated in FIG. 1 as being generally semicircular, the barrier may be disc-shaped and having a light impervious position to permit selective illumination of the light sensing devices as the barrier is rotated.

Referring to FIG. 2, the encoder 10 includes a housing 19, which may be generally C-shaped, for example. The housing has an upper horizontally extending portion 19a which mounts the light emitting diode 15 with its radiation surface oriented downward towards the phototransistors 17 and 18 which are mounted in a lower portion 19b of the housing with their light sensitive surfaces directed upwardly, opposing the light emitting diode 15. The vertical spacing between the light emitting diode 15 and the phototransistors is sufficient to enable the barrier 13 to pass therebetween. The housing also shades the phototransistors 17 and 18 from direct illumination by ambient light.

The phototransistors 17 and 18 are spaced apart on the same circumference as indicated in the simplified layout shown in FIG. 4, i.e., the same radial distance from the axis of the shaft. As the barrier 13 is rotated to move between the light emitting diode and the phototransistors, its leading edge 13a will pass over the two phototransistors 17 and 18 in succession. The light emitting diode 15 (FIG. 2), which is located centrally between and above the two phototransistors 17 and 18, is chosen for its half-intensity angle which should be no less than $\theta$ to insure illumination of both phototransistors. One light emitting diode suitable for this encoder is the type CQX-47, commercially available from AEG-Telefunken.

Referring to FIG. 3, the drive circuit 16 for the light emitting diode 15 includes a pulse generator 21, the output of which is connected through a resistor R1 to the base of a transistor Q1. The light emitting diode 15 is connected in series with a resistor R2 in the collector circuit of transistor Q1 which has its emitter connected to ground.

The pulse generator 21 provides pulses at a rate at least twice the maximum speed expected for the shaft and of a duration of about 40 microseconds. Each pulse applied to the base of transistor Q1 turns on the transistor Q1, energizing the light emitting diode 15 to generate a light pulse for approximately 40 microseconds. The peak current for the diode is determined by resistor R2 and the supply voltage +V, obtained from a 1.5 volt battery, or from an AC to DC converter when AC power is available. By way of example, the peak current for the diode is established to be in the range of 10 to 20 milliamps to provide sufficient radiation intensity to drive the phototransistors to saturation. At this light level, the rise time of the waveform of the signal at the emitter of the phototransistor will be in the range of 10 to 20 microseconds. Although the fall time is much longer than the waveform rise time, in the exemplary embodiment, system response is predicated on the rise time.

The phototransistors 17 and 18 may be the type BBW-42, commercially available from AEG-Telefunken. Each of the phototransistors 17 and 18 has its collector connected to the supply voltage +V and its emitter connected to an associated resistor R3 to ground, and to inputs of the signal processing circuit 12.

The signal processing circuit 20 comprises a pair of AND gates 22 and 23, a latch circuit 24, and a pair of inverters 25 and 26. The outputs of both phototransistors 17 and 18 at the emitters thereof are connected to respective inputs 22a and 22b of AND gate 22, which has a third input 22c connected to an output of a strobe pulse generator which provides a strobe pulse at a rate corresponding to that of the pulse generator 21. The outputs of transistors 17 and 18 are also connected through inverters 25 and 26 to respective inputs 23a and 23b of AND gate 23, which has its third input 23c connected to the output of the strobe pulse generator 27. The output 22d of AND gate 22 is connected to the set input of the latch circuit 24 which has its reset input connected to the output 23d of AND gate 23. The true output of latch circuit 24 is at a logic one level whenever the latch is set and is at a logic zero level when the latch circuit 24 is in its reset state.

The AND gate 22 is primed to be enabled whenever both phototransistors 17 and 18 are conducting. When primed, the AND gate 22 is enabled by the next strobe pulse and generates a set pulse for the latch circuit 24. The outputs of the phototransistors as extended through inverters 25 and 26, maintain AND gate 23 disabled when gate 22 is primed.

When either of the two phototransistors 17 or 18 is shaded by the barrier 13, neither AND gate 22 or 23 can be enabled, but when both phototransistors 17 and 18 are shaded, AND gate 23 is primed and is enabled by the next strobe pulse to generate a reset pulse for the latch circuit 24.

Once the latch circuit 24 is set in response to illumination and conduction of both phototransistors 17 and 18, the latch circuit will remain set even though the output of one phototransistor may fluctuate. Subsequently, when both transistors are shaded, AND gate 23 is enabled to cause the latch circuit to reset. Again, although the output of one of the phototransistors may fluctuate, the latch circuit 24 will remain reset until both phototransistors are subsequently illuminated at the same time.

FIG. 4 illustrates the manner in which the phototransistors 17 and 18 are arranged to be selectively and successively illuminated as a function of angular position of the barrier 13. The state of the latch circuit 24 as well as the state of the two AND gates 22 and 23 (when strobed), are summarized in Table I. The legends S and R represent the condition of the outputs of respective gates 22 and 23, and legend Q represents the true output of latch circuit 24. The designation "x" indicates that the output may fluctuate between logic one and logic 0.

TABLE I

| BARRIER POSITION | S | R | Q |
| --- | --- | --- | --- |
| A | 1 | 0 | 1 |
| B | x | 0 | 1 |
| C | 0 | 0 | 1 |
| D | 0 | x | 0 |
| E | 0 | 1 | 0 |
| F | 0 | x | 0 |
| G | 0 | 0 | 0 |
| H | x | 0 | 1 |

When the barrier is in the position illustrated, designated position A, both phototransistors 17 and 18 are uncovered and thus fully illuminated by the infrared beam from the light emitting diode 15. At position B, phototransistor 17 will be partially covered and its output may fluctuate between logic one and logic zero. As the light level decreases, the rise time of the signal at the emitter of phototransistor 17 will increase, and at some point the signal will not be of sufficient amplitude when the strobe signal occurs to register a logic one. At this point, any slight change in conditions, including ambient light leakage may cause the output to fluctuate. Output fluctuation may also be due to backlash of the gear train which drives the shaft. At position C, transistor 17 is fully covered.

At position D, phototransistor 18 will be partially covered and its output may fluctuate. At position E, both phototransistors are fully covered and shaded from the light source, and at position F, phototransistor 17 will be partially uncovered and its output may fluctuate.

Transistor 17 is uncovered completely at position G and at position H transistor 18 will be partially uncovered and its output may fluctuate.

In summary, as the barrier approaches position H, the latch circuit 24 is set the first time AND gate 22 is enabled, i.e., in response to a strobe signal provided for the first time phototransistor 18 is illuminated while phototransistor 17 is still illuminated. The latch circuit 24 is reset as the barrier approaches position D, and phototransistor 18 first becomes shaded by the barrier while phototransistor 17 is also shaded by the barrier.

The signals generated by latch circuit 24 may be counted and the count stored and used to indicate the number of revolutions completed by the shaft.

OPERATION

Referring to FIGS. 3 and 4, it is assumed that initially the barrier 13 is moving away from the reference point H towards position A so that when the light emitting diode 15 is energized, both phototransistors 17 and 18 are illuminated, and that the latch circuit 24 is set in its true state providing a logic one level output, indicating completion of the last revolution of the shaft.

As the barrier 13 rotates and approaches position B, phototransistor 17 becomes partially covered, and its output will fluctuate as shown in the Table I. Each time the output of phototransistor 17 is high, AND gate 22, when strobed, will produce a set pulse, but such pulse will have no effect on the previously latched state of the latch circuit 24. The output of transistor 17 will eventually stabilize and remain low as the leading edge of the barrier 13 approaches position C.

With continued rotation of the shutter, when position D is reached, phototransistor 18 becomes partially covered and its output may fluctuate between zero and one. The output of phototransistor Q3 coupled with the steady zero output from phototransistor 17 generates a reset pulse via AND gate 23, resetting the latch circuit 24, and its Q output is latched in the zero state. Although the output of phototransistor 18 may briefly fluctuate between logic zero and logic one, generating occasional reset pulses for the latch circuit 24, these pulses have no effect on the state of the latch circuit 24 which remains latched in the zero state.

With continued rotation of the barrier 13 towards position E, transistor 18 becomes covered by the barrier so that both phototransistors 17 and 18 provide a steady zero output.

When the barrier reaches position F, phototransistor 17 becomes partially uncovered and its output will begin to fluctuate as shown in the Truth Table I. When the barrier has moved to position G, phototransistor 17 is fully uncovered; but, because phototransistor 18 remains covered, no set pulses are generated. When the barrier moves to position H, phototransistor 18 becomes partially uncovered and its output begins to fluctuate. With the first logic one level output coupled with the steady state output of phototransistor 17, gate 22 is again enabled, generating a set pulse for the latch circuit 24, providing an indication that the shaft has reached the reference point indicating completion of the present revolution. The latch circuit 24 then remains set as the barrier continues in its movement towards the initial position A.

SOFTWARE IMPLEMENTATION

The signal processing circuit 20 of the encoder apparatus 10 may be implemented by software. In such arrangement, the outputs of the two phototransistors 17 and 18 are scanned periodically to detect coincidence of first signals indicating that both phototransistors are conducting and second signals indicating that both phototransistors are non-conducting. The first occurrence of coincidence of the first signals in a given cycle of revolution of the shaft defines a reference causing a status flag to be set and a revolution count register to be stepped. Once the status flag is set, detection of coincidence of first signals is ignored. The first occurrence of coincidence of the second signals causes the reset of the status flag so that the system is prepared to detect coincidence of the first signals, indicative of completion of another revolution of the shaft.

I claim:

1. An encoder apparatus for indicating revolution of a shaft comprising: a source of light; first and second light sensing means; light barrier means driven by the shaft to shade said first and second light sensing means from said source of light during a portion of each revolution of the shaft; said first and second sensing means each producing an output when illuminated by light from said source, said first and second light sensing means being located in a spaced-apart relationship to be illuminated in sequence as said light barrier means is driven by the shaft, and said light barrier means being configured to enable concurrent illumination of said first and second light sensing means; and signal processing means responsive to first outputs provided by said first and second sensing means upon concurrent illumination thereof to provide an indication of the completion of a revolution of the shaft and to thereafter be responsive to second outputs provided by said first and second light sensing means upon a subsequent concurrent illumination thereof only when said first outputs terminate prior to said subsequent concurrent illumination of said first and second sensing means whereby said signal processing means provides an unambiguous indication at the completion of each revolution of the shaft.

2. Encoder apparatus according to claim 1, wherein said signal processing means responds to the occurrence of said second sensing means output while said first sensing means output is provided to generate a status signal indicating that both sensing means are illuminated, said status signal being terminated upon interruption of the output of either one of said sensing means, and said signal processing means being prevented from generating a further status signal until both said outputs are interrupted, indicative that both sensing means are shaded by said barrier means.

3. Encoder apparatus according to claim 1, wherein said source of light comprises a light emitting diode and a drive circuit for providing a pulsed drive for said light emitting diode, said drive circuit and said light emitting diode being energized by a battery.

4. Encoder apparatus according to claim 2, wherein said light barrier means comprises a planar member having a light impervious portion, said source of light and said first and second light sensing means being disposed in opposing relationship with said planar member being interposed therebetween, and said planar member being carried by the shaft whereby its light impervious portion is moved to be interposed between said source of light and said first and second light sensing means during said portion of each revolution of the shaft.

5. Encoder apparatus according to claim 4, wherein said planar member is semicircular in shape and is made of a light impervious material.

6. Encoder apparatus according to claim 1, wherein said signal processing means comprises detecting means and registering means, said detecting means responding to the outputs produced by said first and second light sensing means to generate a signal whenever both of said light sensing means are illuminated concurrently, and said registering means responding to said signal to provide said indication of completion of a revolution of the shaft, said registering means being unresponsive to signals provided by said detecting means until after the light barrier means is driven sufficiently that both of said light sensing means becomes shaded from said source of light as indicated by termination of outputs thereby.

7. Encoder apparatus according to claim 6, wherein said registering means comprises further detecting means and a bistable circuit, said further detecting means generating a signal whenever said first and second light sensing means are shaded, said bistable circuit being operated to one of its stable states in response to the signal provided by said first-mentioned detecting means, and being operated to its other stable state in response to the signal generated by said further detecting means.

8. Encoder apparatus according to claim 7, wherein said signal processing means further comprises strobe signal generating means for generating a strobe signal for said first and second detecting means.

9. Apparatus for counting the number of revolutions of a shaft, comprising: a source of light; first and second light sensing means each producing an output when illuminated by light from said source of light; light barrier means driven by the shaft to shade said first and second light sensing means from said source of light during a portion of each revolution of the shaft; said first and second light sensing means being located in a spaced-apart relationship to be illuminated in sequence, and said light barrier means being configured to enable concurrent illumination of said first and second light sensing means; and signal processing means responsive to first outputs provided by said first and second sensing means upon concurrent illumination thereof to provide an indication, and to thereafter be responsive to second outputs provided upon a subsequent concurrent illumination of said sensing means only when said first outputs terminate prior to said subsequent concurrent illumination of said first and second sensing means whereby said signal processing means provides an unambiguous indication at the completion of each revolution of the shaft, and means for registering the indications provided over several revolutions of the shaft to record the number of revolutions of the shaft.

10. Apparatus according to claim 9, wherein said source of light includes a light emitting diode energized by a battery.

11. Apparatus according to claim 10, wherein said signal processing means responds to the occurrence of said second sensing means output while said first sensing means output is provided to generate a status signal indicating that both sensing means are illuminated, said status signal being terminated upon interruption of the output of either one of said light sensing means, and said signal processing means being prevented from generating a further status signal until both said outputs are interrupted, indicative that both light sensing means are shaded by said barrier means.

12. Apparatus according to claim 10, wherein said light barrier means comprises a planar member having a light impervious portion, said source of light and said first and second light sensing means being disposed in opposing relationship with said planar member being interposed therebetween, and said planar member being carried by the shaft and whereby its light impervious portion is moved to be interposed between said source of light and said first and second light sensing means during a portion of each revolution of the shaft.

13. Apparatus according to claim 12, wherein said planar member is in the shape of a disc, a portion of which is light impervious.

14. Apparatus according to claim 10, wherein said signal processing means comprises detecting means and registering means, said detecting means responding to the outputs produced by said first and second sensing means to generate a signal whenever both of said sensing means are illuminated concurrently and said registering means responding to said signal to provide said indication of completion of a revolution of the shaft, said registering means thereafter being unresponsive to signals provided by said detecting means until after said light barrier means is driven sufficiently that both of said light sensing means become shaded from said source of light as indicated by termination of outputs thereby.

15. Apparatus according to claim 14, wherein said registering means comprises further detecting means and a bistable circuit, said further detecting means generating a signal whenever said first and second light sensing means are shaded, said bistable circuit being operated to one of its stable states in response to the signal provided by said first-mentioned detecting means, and being operated to its other stable state in response to the signal generated by said further detecting means.

16. An encoder apparatus for indicating revolution of a shaft comprising: activating means; first and second sensing means; barrier means driven by the shaft to overlie said first and second sensing means during a portion of each revolution of the shaft; said first and second sensing means each producing an output when activated by said activating means, said first and second sensing means being located in a spaced-apart relationship to be activated in sequence as said barrier means is driven by the shaft, and said barrier means being configured to enable concurrent activation of said first and second sensing means; and signal processing means responsive to first outputs provided by said first and second sensing means upon concurrent activation thereof to provide an indication of the completion of a revolution of the shaft and to thereafter be responsive to second outputs provided by said first and second sensing means upon a subsequent illumination thereof only when both said first outputs terminate prior to said subsequent concurrent illumination of said first and second sensing means whereby said signal processing means provides an unambiguous indication at the completion of each revolution of the shaft.

17. An encoder apparatus for indicating revolutions of a shaft, comprising: a source of light; first and second light sensing means each producing an output when illuminated by light from said source of light; a light barrier means driven by the shaft to shade said first and second light sensing means from said source of light during a portion of each revolution of the shaft; said first and second light sensing means being located in a spaced-apart relationship to enable said first light sensing means and said second light sensing means to be illuminated in sequence as said light barrier means is driven by the shaft, and said light barrier means being configured to enable said second light sensing means to be illuminated while said first light sensing means is illuminated, and signal processing means including first detecting means and registering means, said first detecting means responding to said first and second light sensing means to generate a signal when both of said light sensing means are illuminated; and said registering means responding to said first and second light sensing means and said first detecting means to register a single indication for each revolution of the shaft, said registering means comprising a bistable circuit and second detecting means which generates a signal whenever said first and second light sensing means are shaded, said bistable circuit means being operated to one of its stable states in response to the signal provided by said first detecting means and being operated to its other stable state in response to the signal generated by said second detecting means.

* * * * *